US006993209B1

(12) United States Patent
Schowtka et al.

(10) Patent No.: US 6,993,209 B1
(45) Date of Patent: Jan. 31, 2006

(54) LOW RESOLUTION-TO-HIGH RESOLUTION IMAGE CORRELATION

(75) Inventors: Alexander K. Schowtka, Weston, MA (US); Anatoliy V. Tsykora, Waltham, MA (US)

(73) Assignee: VistaPrint Technologies Limited, Hamiton (BM)

( * ) Notice: Subject to any disclaimer, the term of this patent is extended or adjusted under 35 U.S.C. 154(b) by 440 days.

(21) Appl. No.: 10/205,958

(22) Filed: Jul. 26, 2002

(51) Int. Cl.
*G06K 9/32* (2006.01)

(52) U.S. Cl. ....................................... 382/298; 382/301

(58) Field of Classification Search ................ 382/177, 382/309, 298, 299, 301; 395/1.2, 1.11; 715/513, 715/518, 519, 530, 531, 760; 358/1.2, 1.11

See application file for complete search history.

(56) References Cited

U.S. PATENT DOCUMENTS

| | | | | |
|---|---|---|---|---|
| 5,778,403 | A * | 7/1998 | Bangs | 715/518 |
| 6,512,522 | B1 * | 1/2003 | Miller et al. | 345/474 |
| 2003/0095135 | A1 * | 5/2003 | Kaasila et al. | 345/613 |

* cited by examiner

*Primary Examiner*—Phuoc Tran
(74) *Attorney, Agent, or Firm*—Robert Dulaney

(57) ABSTRACT

Systems and methods for facilitating a WYSIWYG relationship between character strings when rendered on a relatively low resolution device, such as a computer monitor, and the same character strings when rendered on a relatively high resolution device, such as a laser printer or commercial offset printing press, involve determining the difference in the widths of each character string when rendered in both the low resolution format and the high resolution format and inserting or deleting space as required between the individual characters in the character string such that the widths of the low resolution and high resolution strings are substantially equalized.

15 Claims, 8 Drawing Sheets

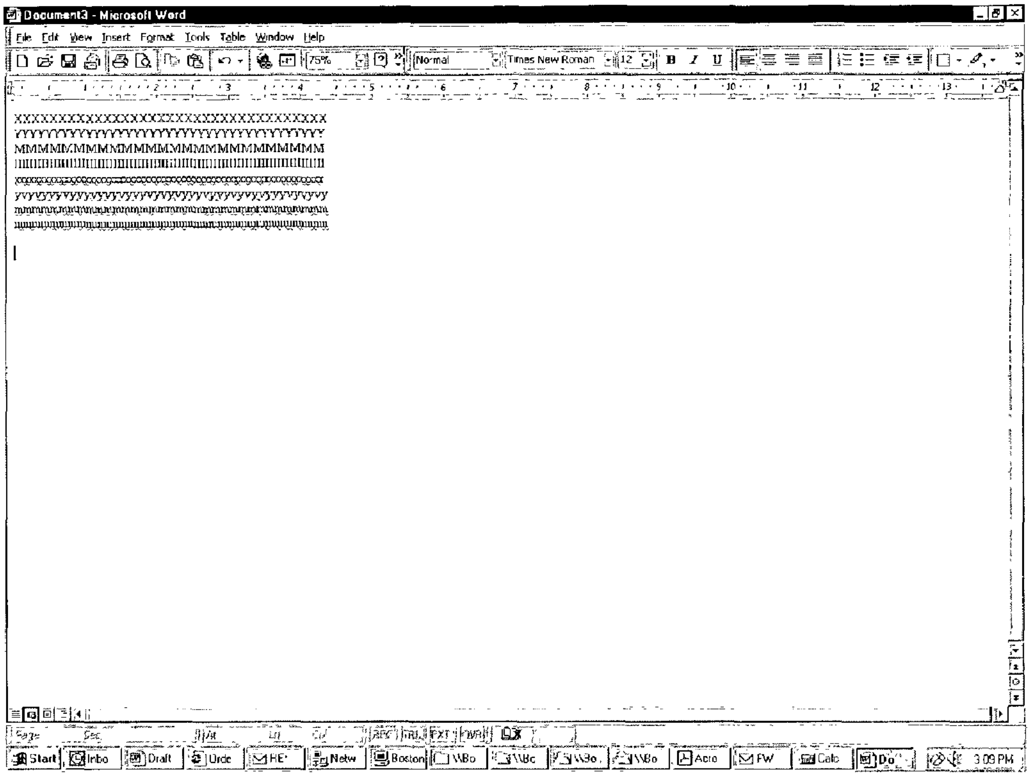

FIG. 2A

XXXXXXXXXXXXXXXXXXXXXXXXXXXXXXXX
YYYYYYYYYYYYYYYYYYYYYYYYYYYYYYYYYYYY
MMMMMMMMMMMMMMMMMMMMMMMMMM
IIIIIIIIIIIIIIIIIIIIIIIIIIIIIIIIIIIIIIIIIIIIIIIIIIIIIIIIIIIIIIII
xxxxxxxxxxxxxxxxxxxxxxxxxxxxxxxxxxxxxxxxxxxxxxxxxxxxxxxxxxxx
yyyyyyyyyyyyyyyyyyyyyyyyyyyyyyyyyyyyyyyyyyy
mmmmmmmmmmmmmmmmmmmmmmmmmmmmmmmmmmmm
iiiiiiiiiiiiiiiiiiiiiiiiiiiiiiiiiiiiiiiiiiiiiiiiiiiiiiiiiiiiiiiiiiiiiiiiiiiiiiiiiiiiiiiiiiii

FIG. 2B

LOW RESOLUTION-TO-HIGH RESOLUTION IMAGE CORRELATION

FIELD OF THE INVENTION

The present invention relates generally to preparing electronic documents for printing and, more particularly, to a system and method for decreasing the disparity between characters as they appear on a display device, such as a computer monitor, and as they appear when rendered on a print medium.

BACKGROUND OF THE INVENTION

The use of computers to create documents for printing is well known, as is the use of high-resolution output devices, such as laser printers and prepress systems. Despite the fact that computers and high-resolution output devices are commonly connected, the two types of devices have inherent incompatibilities that have chronically troubled computer and printing companies.

For ease of description, all letters, numbers, punctuation marks, graphic elements and symbols that are supported by a given font are collectively referred to herein as "characters". Well-known data formats, such as PostScript and TrueType, have been developed for storing and representing characters and are in widespread use. In these formats, the shape of each character is described using vectors and/or curves, making the characters highly scalable. High-resolution output devices, such as laser printers and prepress systems typically are designed to use these data formats. The resolution of such systems is usually 300 dots per inch ("dpi") or higher.

By contrast, a computer monitor displays characters as a set of pixels on the monitor screen. The typical computer monitor has a resolution of either 72 or 96 pixels per inch ("ppi"). For the purpose of this discussion, a 72-ppi monitor will be discussed although persons skilled in the art will appreciate that the invention can be readily applied to monitors of other resolutions.

The computer monitor inherently renders characters that are approximations of the same characters rendered by a high-resolution output device. Therefore, high-n resolution characters must typically be either rounded up or rounded down to the next closet pixel for rendering on a 72-ppi device. Rasterization and scaling programs are in common use to convert characters from their high-definition vector description to a bitmap for computer display.

Referring to FIG. 1, an illustrative example is shown. In this example, the character A, if rendered by a high-resolution system would have the width Y. For the purpose of this illustration, width Y is assumed to be 89 dots at a resolution of 300 dpi. Width Y in this case is equal to 21.36 pixels. For displaying the character on a computer screen, the character size would need to be expressed as an integer number of pixels. In this case, it would typically be rounded down to 21 pixels, represented by width X in FIG. 1.

The result, as shown in FIG. 1, is that the width of the character A is less when rendered on a monitor than the same character in the same font and point size would be if rendered on a print medium. With other characters, other fonts, or other point sizes, the size of the character displayed on the monitor could have been larger. For example, if the width Y of character A had been 90 dots, instead of 89 as shown in FIG. 1, the equivalent width in pixels would have been 21.6. This would typically have been rounded up to 22, resulting in the A displayed on the screen being wider than the printed A.

The cumulative effect of these slight shifts in character width are sufficient to make the size of character strings displayed on the screen an unreliable indicator of the size of the same character strings on the printed page. As an example of the potential result of this cumulative effect, FIG. 2A shows several character strings authored in Microsoft Word 2000 in HTML "Web Layout" mode. The lengths of all of the character strings are approximately equal when viewed in HTML. FIG. 2B shows these same character strings when printed on a laser printer. As can be seen, the same character strings have widely varying lengths when rendered on a high-resolution device.

For certain type of applications, it is highly desirable that the printed image be substantially identical to the image that the computer user sees on the user's monitor screen. Having the printed image look like the monitor image is commonly known as "what you see is what you get", abbreviated as WYSIWYG. WYSIWYG is available to computer users in modern word processing, desktop publishing, and other computer applications, but has not been achieved in some circumstances. Hypertext Markup Language, commonly known as HTML, is one well-know example of an area where WYSIWYG has been elusive.

HTML is the standard language used to create documents on the World Wide Web (the "Web") today. As such, businesses wishing to communicate with their customers or potential customers on the Web must typically deal with their customers, at least in part, in HTML. As is well known, computer users can use a browser, such as Microsoft Internet Explorer or Netscape Navigator, to locate, download and display web pages to the user.

Originally, HTML pages were static displays intended simply for viewing. Modern browsers support enhancements of HTML functionality, such as XML and Dynamic HTML (DHTML), which allow for HTML pages to be revised and manipulated on the browser itself. Tools for creating documents in a browser are known in the art. One prior art system for performing browser-based document creation and editing is disclosed in U.S. Pat. No. 6,247,011 entitled Computerized Prepress Authoring for Document Creation, which is hereby incorporated by reference. Software programs, such as the Web Capture component of Adobe Acrobat, that perform the task of converting a document created in HTML into a high resolution format reflecting what the document will look like when rendered on a high resolution device are commercially known and available.

For the reasons discussed above, when a document that was created on a computer screen in HTML is printed on a high-resolution output device, the printed product normally does not look exactly like the HTML image on the computer screen. This is a particularly serious problem if the computer user is expressly trying to print an image exactly as it appears on the screen. For example, the user may have precisely aligned lines of text only to find that they are misaligned in the printed version. This has severely limited the usefulness of HTML for many printing applications.

Various techniques have been used in the prior art to try to work around this HTML-to-print problem. One prior art technique involves incorporating bitmaps into the HTML page being viewed by the user. For example, after a user inputs text into an HTML form, the form is transmitted over a network to a server where the data is used to generate a bitmap image. The bitmap image is then transmitted back over the network to the user's computer for the user to view.

The user typically has little or no ability to modify the bitmap images, so if the user is not satisfied with the bitmap image, new sets of data must be sent to the server where a new bitmap image must be generated and again sent over the network to the user. As can be appreciated, this prior art technique can cause repetitive network traffic to and from the user's computer during the document preparation process. The system may lead to user frustration if the user experiences transmission delays or is dissatisfied that the bitmap image returned from the server does not reflect the user's desired document appearance, requiring reentry of text by the user.

Another prior art technique involves doing a "screen capture" operation that results in the reproduction of the screen faithfully on the print medium. This method has the drawback of rendering the screen in a pixilated fashion. In other words, because the screen image has a resolution of only 72 or 96 ppi, while the typically high resolution printer has a resolution of 300 dpi or higher, the character from the screen will not be rendered smoothly, but will appear on the printed page with rough or jagged lines and edges, as can be seen in the example of the bottom A in FIG. 1. This makes the printed image unsatisfactory for most applications.

In the printing field, it is well known that adjustment of the spacing between some characters can have a beneficial effect on the appearance of the characters. Commercially available rendering tools, therefore, typically provide for some user control of character spacing. Two common prior art spacing techniques are kerning and tracking.

Kerning is the adjustment of the spacing between specific letter pairs to improve the appearance of the pair and reduce the perception of unevenness that certain pairs of letters create. Kerning generally involves only reducing the space between the characters in the pair. The set of character pairs that would benefit from kerning depends on the specific font being used. The font software typically includes pre-set kerning tables and also allows the user to add additional character pairs or otherwise do customized kerning.

Tracking refers to the addition or deletion of a uniform amount of space between every character pair. Developers of font software often employ a default character spacing that is based on appearance and readability of the font at a common point size, such as 12. The same spacing may not, however, be optimum in all cases, such as when the user elects to use a significantly smaller or significantly larger point size. It is generally accepted that the readability of smaller type sizes can be improved by making the space between each character relatively larger. Similarly, the readability of larger type sizes can be improved by making the space between each character relatively smaller.

Despite the desirability of WYSIWYG printing and the extensive development and use of the Web and related systems, the problem of HTML-to-print incompatibilities has continued to trouble Web developers and users. As can be appreciated from the discussion above, it would be highly desirable to provide a system and method whereby a user can use the browser to create an HTML document and have the document be rendered on a print medium in a WYSIWYG manner.

SUMMARY OF THE INVENTION

It is an object of the invention to provide WYSIWYG functionality in an HTML environment without the necessity for transmitting HTML documents from a client to a server for rendering into a different format and then returning the converted versions to the client for viewing.

It is a further object of the invention to provide that documents printed on a high-resolution device, such as a laser printer or prepress system, will appear substantially identical to the document as it appeared in HTML format on a computer monitor.

In accordance with the invention, the spacing between the characters in each character string is adjusted such that the widths of the character strings viewed in HTML on a computer monitor is substantially equal to the widths of the same character strings when printed on a high-resolution device.

In accordance with one aspect of the invention, a method and apparatus is provided for adjusting the spacing between the characters in each character string in the high-resolution version of the document is either increased or decreased, as appropriate, to adjust the width of the high-resolution character string such that it substantially equals the width of the character string when viewed in HTML on a computer monitor.

Other objects, features and advantages of the invention will become apparent from the following figures and description.

BRIEF DESCRIPTION OF THE DRAWINGS

FIG. 2A is a screen shot of several character strings viewed in HTML mode.

FIG. 2B shows the same character strings as printed on a high-resolution device.

DESCRIPTION OF THE PREFERRED EMBODIMENT OF THE INVENTION

For the purposes of clarity of disclosure, the invention will be discussed in the context of a method and system for preparing a business card. As will be appreciated by those in the art, the invention is in no way limited to business cards or similar printed materials but could be usefully employed in any situation involving conversion between formats having different resolutions where retaining overall spacing and alignment is desirable.

Further, the following description discusses a document prepared in HTML for eventual conversion into a high-resolution page description language, such as Adobe PDF, that is compatible with the input requirements of high-resolution printing systems. It will be understood by those skilled in the art that the invention is not limited to use with HTML or PDF, but can be usefully employed with other languages and formats and in a variety of different situations.

Figure 1:
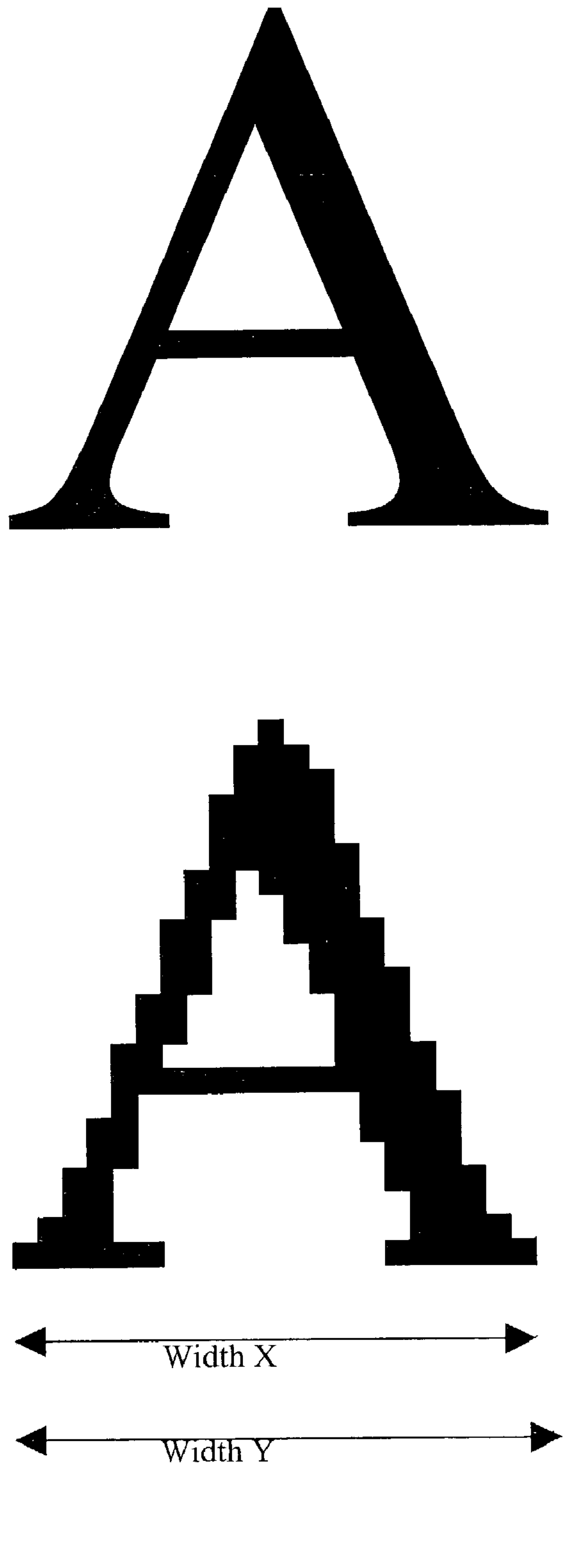
FIG. 1 is an illustration of the variation in width between a character rendered on a computer monitor and the same character rendered on a higher resolution device.
Figure 3A:
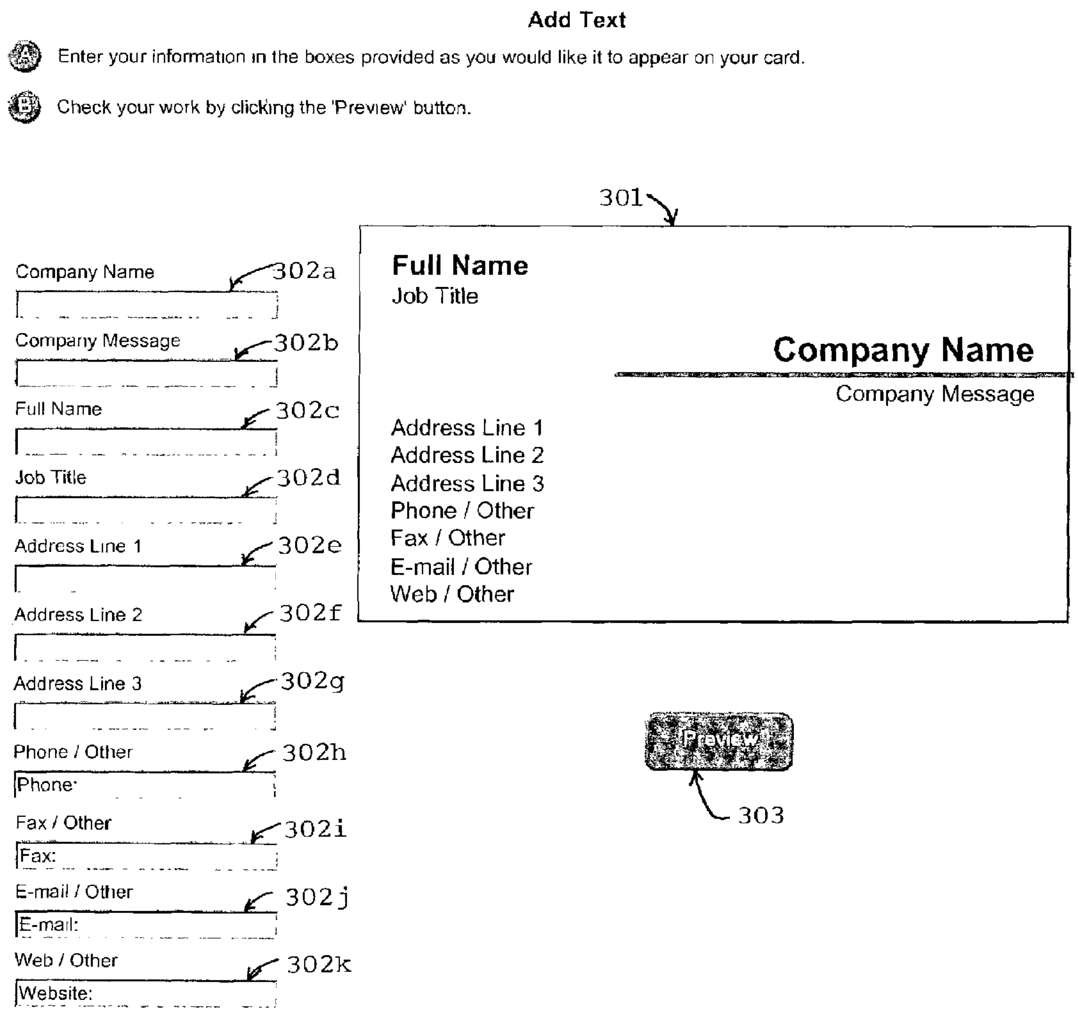
FIG. 3A shows a business card preparation template.

FIG. 3A depicts a sample business card preparation template 300, such as could be selected by a user from a number of available templates displayed on a printing company web site and available for transmitting over the Web from the printing company's server to the user's computer system. The downloaded template is displayed to the computer user in the network browser that is running on the user's computer. Template 300 contains a sample card layout 301 with a number of fields of default information displayed to indicate to the user the suggested content and organization of the card. The screen also displays a number of data entry fields 302*a* through 302*k*, each data entry field being associated with one of the fields of default information shown in template 301.

Figure 3B:
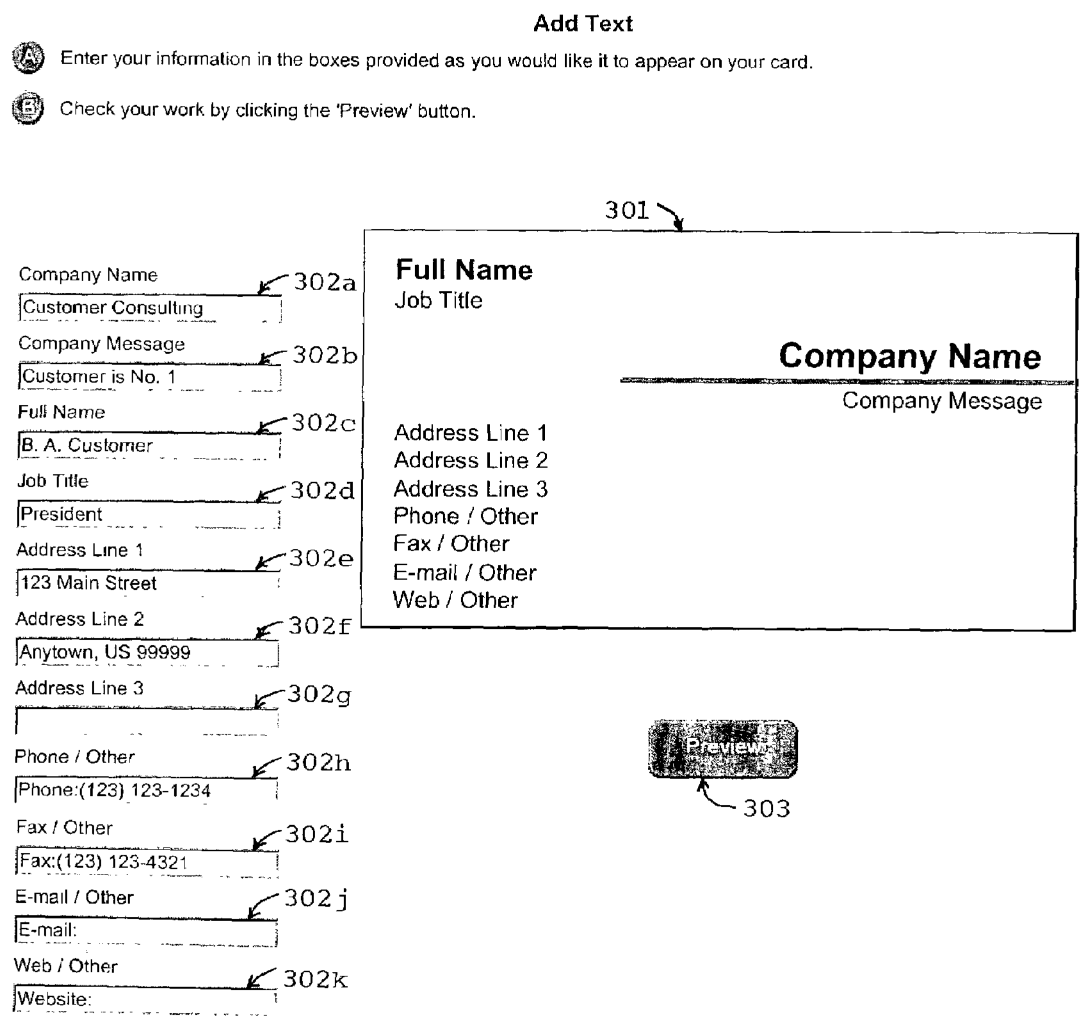
FIG. 3B shows the business card preparation template with customized information entered in the data entry fields.
Figure 3C:
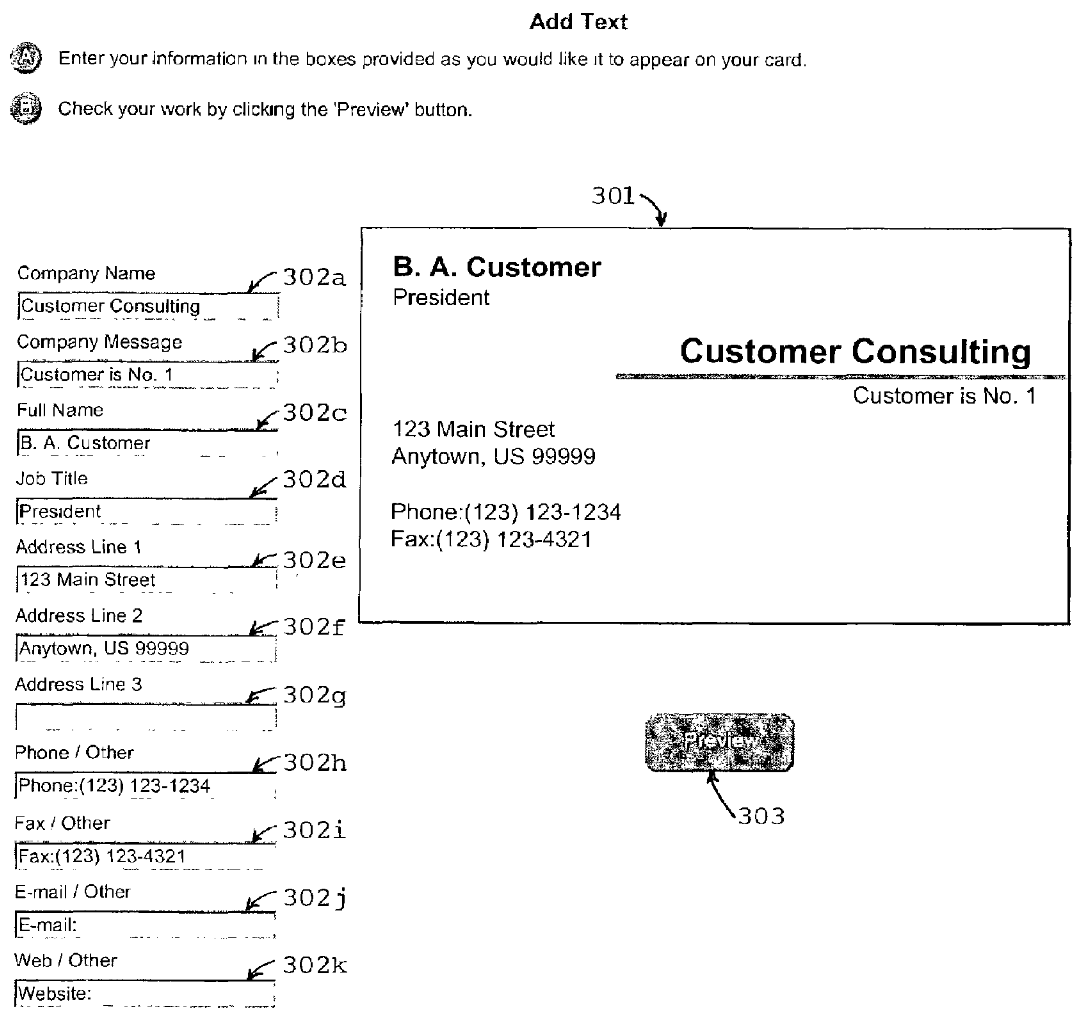
FIG. 3C shows the business card preparation template updated to incorporate the customized information.

The user may enter custom information in some or all of the data fields 302*a*–302*k*. FIG. 3B shows an example of the screen 301 having some of the fields completed by a fictional user. If the user wishes to review the appearance of the card as it will appear when printed, the user clicks preview button 303. FIG. 3C shows the card template in HTML updated in response to button 303 to reflect the user-specific information that was entered by the user in FIG. 3B. If the user wishes to alter some or all of the information, the user can modify the information in one or more of the fields 302*a*–*k* and again click preview button 303. When the user has completed the editing of the card, the user can continue through other screens (not shown) to perform other actions, such as saving the card in a shopping basket or supplying additional information to complete the purchase.

The server will upload the card description to the server and store it for future use. The card is saved by the server system as an XML and XHTML data structure containing the card layout and the custom content entered by the user. Other information that is associated with the card, such as the quantity ordered, type of paper, method of delivery, will also be uploaded and stored. At this point, conversion to a prepress format has not yet been required or performed. When the card is to be prepared for printing, which could be some period of time later, the data structure is converted into a prepress format, as is typically required for raster image processing by state of the art printing facilities. As discussed below, at the time the prepress version is created, adjustments are made to correct width differences that would otherwise appear in the printed document.

In a preferred embodiment, the card creation process shown in FIGS. 3A–3C and discussed above occurs entirely within the user's browser. The card image is viewed by the user in HTML format. It is highly desirable to customers that the printed card look substantially identical to the card viewed and approved using the user's browser. The current invention allows the HTML image displayed on the user's monitor to be a faithful depiction of the finished printed card.

Figure 6:
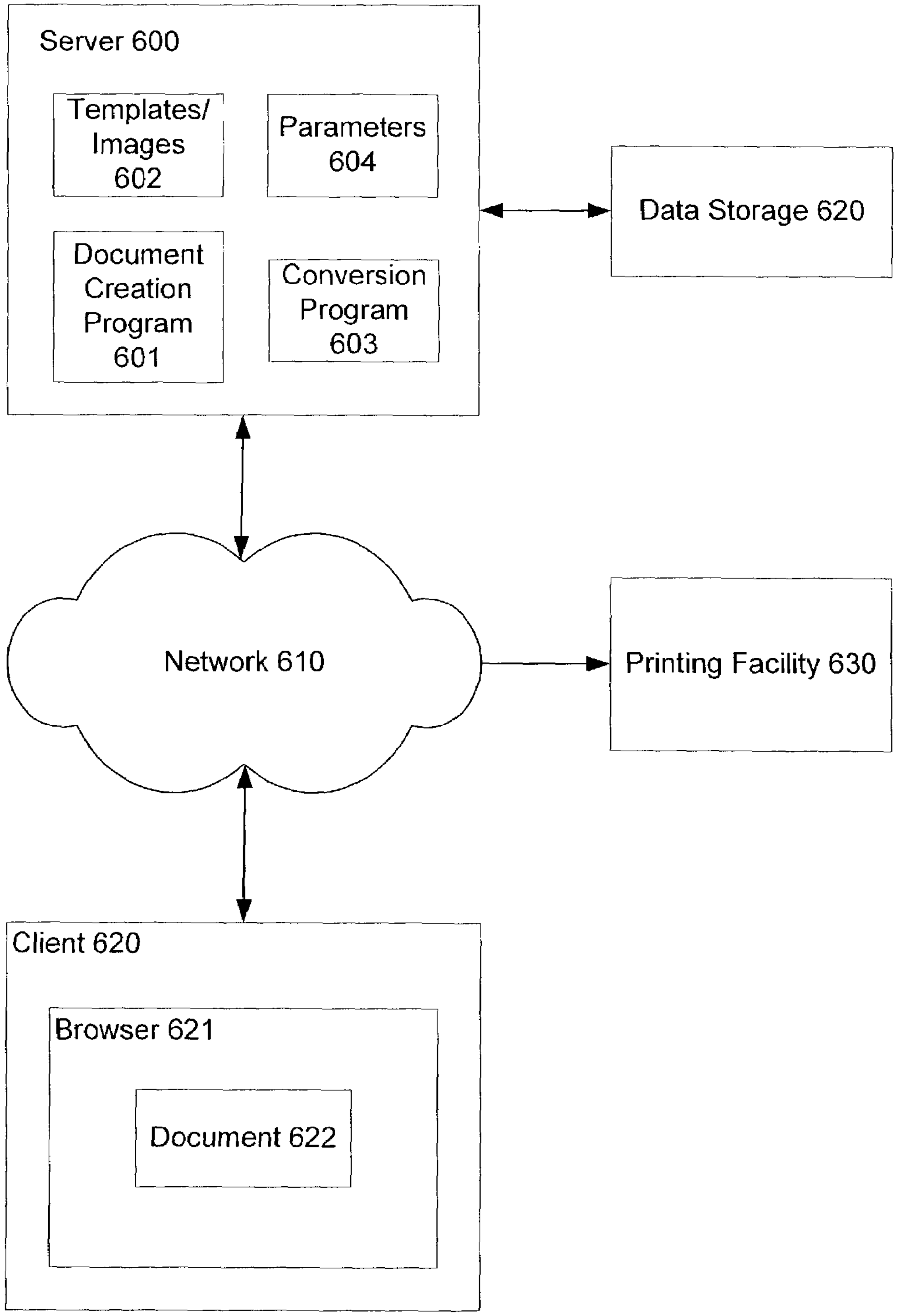
FIG. 6 shows a diagram of a system with which the invention may be employed.

FIG. 6 is a diagram of a Web environment with which the invention may be usefully employed. Server 600 is a Web server having a universal resource locator and being adapted to permit computers having access to the Web, such as client 620, to access server 600 and download Web pages and other materials. While shown in FIG. 6 as a single unit, it will be understood that server 600 may in fact be comprised of a plurality of individual processors or separate computers operating cooperatively so as to provide computational and informational support to Web users. In the preferred embodiment shown in FIG. 6, client computer 620 is a PC or similar computer having a processor, a memory, a display, and input devices, such as a keyboard and a mouse, however, it will be understood that the invention is applicable to other devices having relatively low resolution electronic displays, such as palmtop computers, personal digital assistants (PDAs), and cellular telephones.

In a preferred embodiment, client 620 is running a browser program 621, such as Microsoft Explorer or Netscape Navigator. While FIG. 6 depicts server 600 and client 620 communicating via network 610, it will be understood that the invention is not limited to network applications, but can be usefully employed with other situations involving two media having different resolution capabilities.

Server 600 includes a downloadable document creation program 601 for downloading to and execution on client 620 in browser 621. Server 600 may also make available a plurality of downloadable document templates and images 602 to assist client 620 in creating document 622. The human operator of client 620 will be controlling the detailed creation of document 622 using the keyboard and/or mouse and observing the state of the document on the video monitor of client 620. When document 622 is satisfactory to the operator, the operation transmits document 622 as an HTML document over network 610 to server 600. Server 600 will typically store document 622 in data storage 620, for example one or more disk drives or a disk array, for later retrieval.

Prior to printing on a high-resolution printing system, document 622 will be converted from HTML to a suitable prepress format, such as PDF. For this purpose, server 602 uses a commercially available conversion program 603, such as PDFLib from PDFLib GmbH. Server 600 supplies document 622 to conversion program 603 along with user-definable parameters, represented in FIG. 6 as parameters 604. As discussed below, parameters 604 include control of the character spacing characteristics to be applied by conversion program 603. After conversion to a prepress format by conversion program 603, server may forward the converted document to printing facility 630 over network 610, either alone or in combination with other print jobs.

Figure 4:
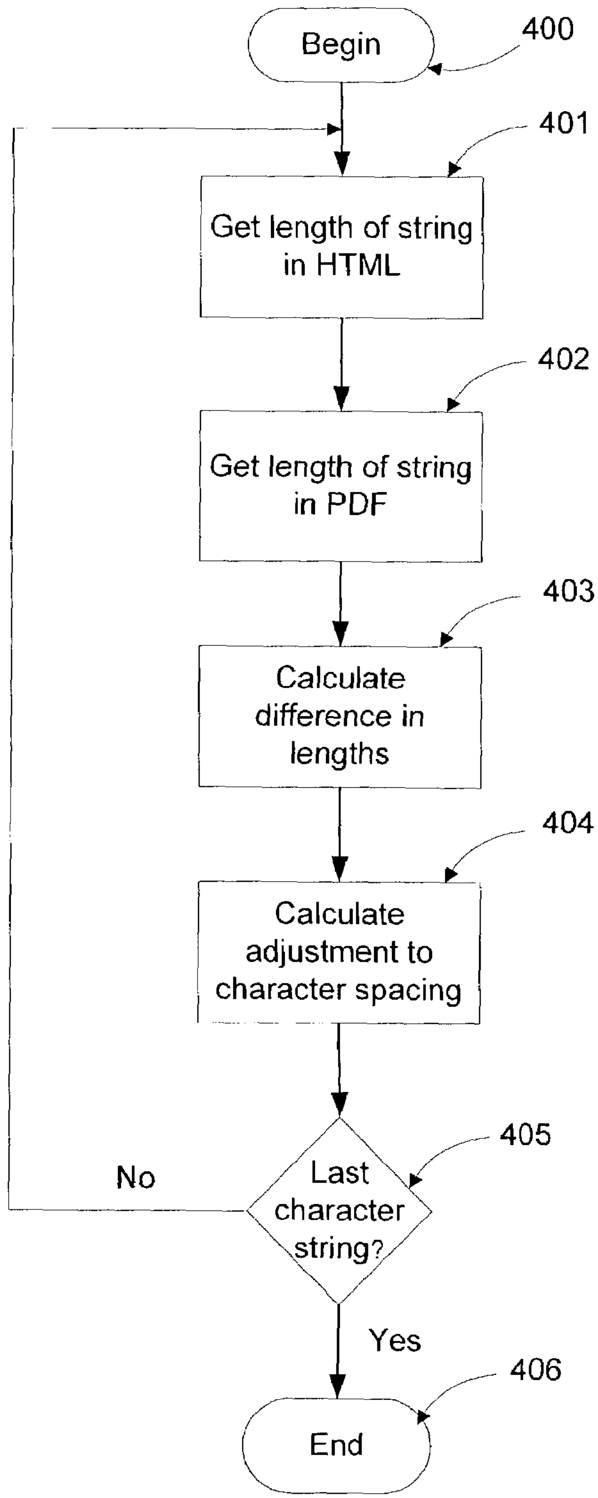
FIG. 4 shows a flow chart depicting an embodiment of the invention.

FIG. 4 shows a preferred method of adjusting the way in which the character string received from the HTML template will be rendered on a print medium. The described steps do not have to be performed in the sequence indicated. As will be appreciated, other sequences of operation or step variations could be implemented to achieve the same result. In step 401, the length of the character string in HTML is obtained from the browser. In a preferred embodiment, server 600 maintains copies of a variety of common browsers. The server supplies the character string to the browser and requests the browser to return the width of the character string. This is a standard command supported in modern browsers and will usually return the width in pixels. In step 402, the width of the string when rendered into a high-resolution format such as PDF is obtained. This can be obtained from commercially available sources such as Microsoft Word or Microsoft Windows API. Different tools may return the width measured in different units, typically either in pixels or in twips, a twip being equal $1/20^{th}$ of a point (equivalent to $1/1440$ of an inch.)

The difference between the two lengths is calculated in step 403. In a preferred embodiment, the width of the line in PDF is subtracted from the width of the line in HTML. This result will be positive if the HTML character string is longer than the PDF character string and will be negative if the HTML character string is shorter than the PDF character string. As discussed below, the relative length of the two lines can be used to calculation an adjustment factor that is used to adjust the rendering tool's spacing between the characters.

The insertion or deletion of the required space is accomplished by using parameters 604 to control the character spacing function of conversion program 603. Modern rendering tools contain default rules that are applied to determine the spacing between individual characters. These tools also provide the ability for the user to modify the default spacing rules. In a preferred embodiment, the widths of the strings are equalized by proportionally adjusting the value of the character spacing parameter of the rendering tool.

In step 404, the required adjustment to the inter-character spacing is calculated. Referring to the equation below, the width of the line in PDF equals Y and the width of the line in HTML equals X. SP is the default character spacing adjustment parameter used by the rendering tool to calculate character spacing. The spacing parameter might, for example, be set to 100% as a default. Setting the spacing parameter to 110% would cause the character spacing to be increased to 110% of the default. Similarly, if the spacing factor were set to 90%, then the adjusted spacing would be 90% of the default. Referring to the following formula, the adjusted spacing parameter value, SPA, is calculated according to the following:

$$SPA=SP*(1+(X-Y)/Y))$$

As can be seen, if the HTML character string is wider than the PDF character string, then (X−Y) will be a positive number, causing (1+(X−Y)/Y) to be greater than 1 and SPA to be larger than SP such that the character spacing will be used by the rendering tool and the length of the PDF character string will be increased in length such that it substantially equals the length of the HTML string. Similarly, if the HTML character string is narrower than the PDF character string, them (X−Y) will be a negative number causing (1+(X−Y)/Y) to be less than 1 and SPA to be decreased such that the width of the PDF character string is decreased in length such it substantially equals the length of the HTML character string. There may have to be some rounding to the result of this calculation, depending on the precision with which the high-resolution rendering tool can adjust the character spacing. Even if some rounding is required, any rounding will be very small relative to the pixel-based rounding discussed above. The effect of any required rounding will be so small as to be essentially imperceptible to the user.

As shown in FIG. 3A, there will typically be several character strings on a document. Each string will contain a different set of characters and, therefore, steps 401–405 will be performed for each individual string. When all strings have been appropriately adjusted, the process will terminate at step 406.

As discussed above, in a preferred embodiment, any required expansion or reduction of inter-character space is accomplished by increasing or decreasing, as appropriate, the amount of space inserted by the rendering tool's tracking feature such that the space between the characters in the string is proportionally increased or decreased. The invention is not, however, limited to this approach.

Figure 5:
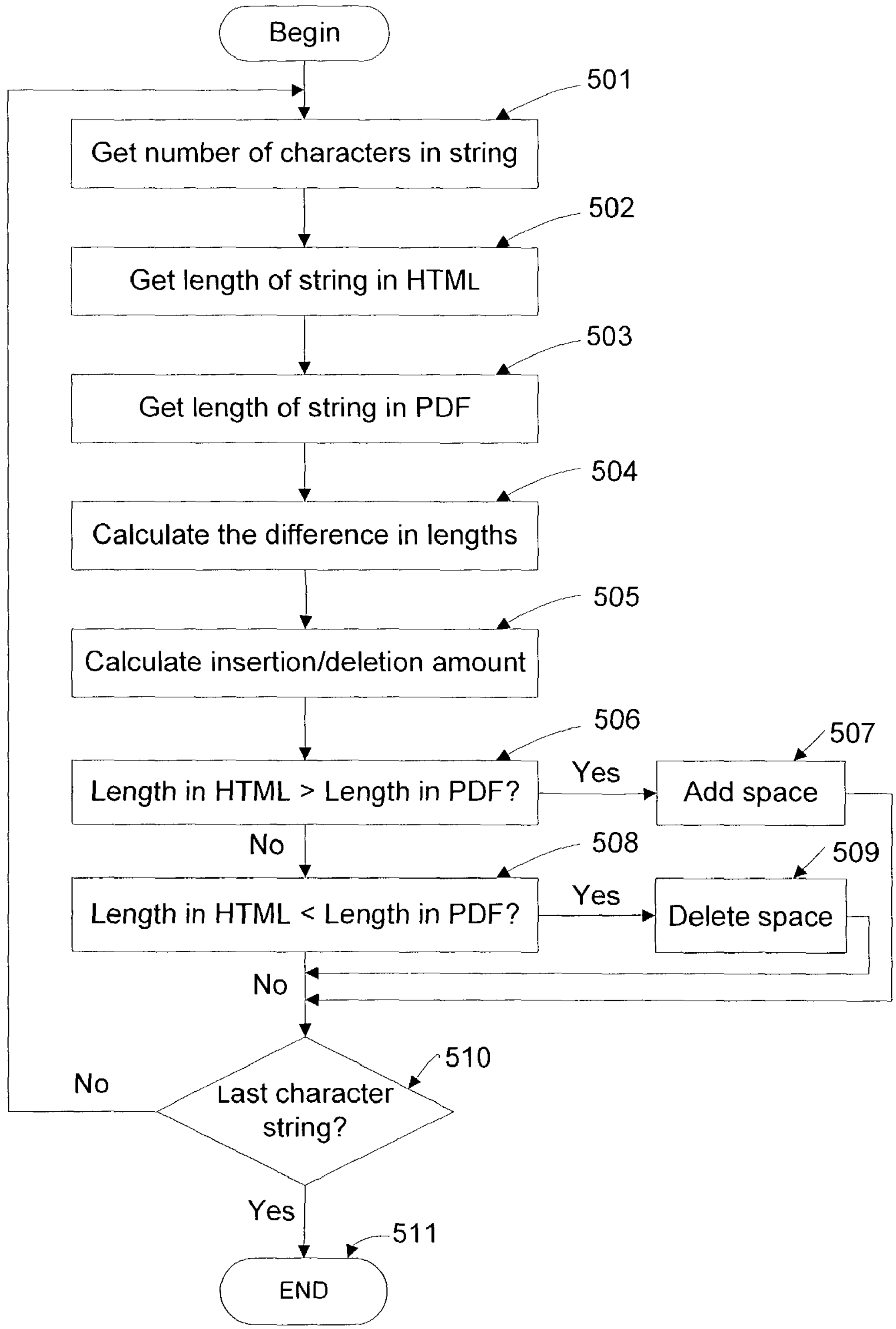
FIG. 5 shows a flow chart of an alternate embodiment of the invention.

As an alternate embodiment, equalization of the widths of character strings could be accomplished by inserting an equal amount of space between each character pair. A preferred embodiment of this alternate method is shown in FIG. 5. Again, the described steps do not have to be performed in the sequence shown and other variations could be readily implemented to achieve the same result. In step 501 the number of characters in a first character string is obtained. In step 502, the length of the character string in HTML is obtained from the browser. In step 503, the width of the string when rendered into a high-resolution format is obtained. The difference between the two lengths is calculated in step 504.

In step 505, the incremental amount of space to be added to or removed from the standard spacing between each character pair is calculated. This could be accomplished by dividing the difference in widths determined in step 504 by the number of inter-character spaces. For a string of N characters, there are N−1 spaces between character pairs. As with the method described earlier, there may have to be some rounding to the result. The effect of any required rounded will be relatively small.

If the width in HTML is determined to be greater than the unadjusted width in PDF in step 506, then the incremental space calculated in step 505 is inserted between each character pair in step 507. If the character string in PDF is determined to be shorter than it appeared to the user on the screen in HTML in step 508, then in step 509 the amount of space calculated in step 505 is inserted in the PDF string between each character pair to extend its length so that it will be substantially equal in length to the original HTML string. Step 510 will cause this process to repeat until all character strings have been adjusted as required.

In the preferred embodiment discussed above, the high-resolution version of the document is modified to reflect the widths of the character strings in HTML. This implementation does not require any modification to the operation of the browser itself and is widely adoptable because the basic functions and operations of high resolution rendering tools are well understood. There might, however, be a situation where it is considered preferable to manipulate the image at the client instead of at the server. In this situation, the invention could be employed within the browser to achieve a similar result through manipulation of the image displayed on the client display. Applying the above-described technique, a number of pixels to be added to or deleted from the usual spacing between characters displayed on the monitor could be calculated. That is, instead of manipulating the high-resolution image, the HTML image displayed in the browser to the user would be modified to make it more closely approximate the width of the high-resolution version. The browser has all of the information regarding the character string needed to make this adjustment. Browser vendors, or anyone of ordinary skill in the art having the ability to access and modify browser software, could employ the invention to cause the character string displayed on the browser to be adjusted using the techniques disclosed herein.

Further, the above methods could be combined with kerning of certain character pairs to provide additional adjustments. As another example, if the character string contains spaces between words or other relatively large blank areas, these relatively large spaces can be enlarged or reduced to a greater or lesser degree than the spaces between individual characters within a word to provide for additional adjustments.

While the invention has been shown and described in one preferred embodiment, the described embodiment is to be considered as illustrative rather than restrictive. The scope of the invention is as indicated in the following claims and all equivalent methods and apparatus.

We claim:

1. A computer implemented method for preparing a page description language version of an electronic document having one or more lines of characters entered by a document preparer such that, when the page description language version is used to create a printed version of the document, the printed version will be consistent with the appearance of the electronic document as it was displayed to the document preparer, the method comprising:

(a) for each of the lines of characters in the document entered by a document preparer, determining a spacing adjustment for the line by
    (i) determining the width of the line if displayed on a computer display,
    (ii) determining the width of the line if converted to a page description language version using one or more initial character spacing parameters, and
    (iii) determining an adjustment to be applied to one or more of the initial character spacing parameters that is sufficient to cause the page description language version of the line created using the one or more adjusted spacing parameters to have an adjusted line width that is substantially equal to the width of the line if displayed on a computer display, and
(b) making the adjustments for the lines available to a conversion program for creating a page description language version of the document such that, when the conversion program is used to create a page description language version of the document, the spacing of each line of characters in the page description language version is adjusted according to the adjustment determined for that line.

2. The method of claim 1 wherein the adjustment determined for each line is at least a proportion by which the spacing between the characters as determined by using the one or more initial spacing parameters will be modified.

3. The method of claim 1 wherein the adjustment determined for each line is at least a fixed amount of space by which the spacing between the characters as determined using the one or more initial spacing parameters will be modified.

4. The method of claim 1 further comprising creating a page description language version of the document using the adjustments.

5. The method of claim 4 further comprising forwarding the page description version to a printer.

6. The method of claim 1 wherein the document is a markup language document and wherein the width of the line if displayed on a computer display is determined by requesting the displayed line width from a browser.

7. The method of claim 5 further comprising printing the document.

8. One or more computer readable media having embodied therein computer program code for preparing a page description language version of an electronic document having one or more lines of characters entered by a document preparer such that when the page description language version is used to create a printed version of the document, the printed version will be consistent with the appearance of the electronic document as it was displayed to the document preparer, the code comprising:

(a) computer program code for determining a spacing adjustment for each of the lines of characters line including
    (i) computer program code for determining the width of each line if displayed on a computer display,
    (ii) computer program code for determining the width of each line if converted to a page description language version using one or more initial character spacing parameters, and
    (iii) computer program code for determining an adjustment for each line to be applied to one or more of the initial spacing parameters that is sufficient to cause the page description language version of the line created using the one or more adjusted spacing parameters to have an adjusted line width that is substantially equal to the width of the line if displayed on the computer display, and
(b) computer program code for making the adjustments for the lines available to a conversion program for creating a page description language version of the document such that, when the conversion program is used to create a page description language version of the document, the spacing of each line of characters in the page description language version is adjusted according to the spacing adjustment determined for that line.

9. The computer program code of claim 8 wherein the adjustment determined for each line is at least a proportion by which all spacing between the characters as determined using the one or more initial spacing parameters will be modified.

10. The computer program code of claim 8 wherein the adjustment determined for each line is at least a fixed amount of space by which all spacing between the characters as determined using the one or more initial spacing parameters will be modified.

11. The computer program code of claim 10 further comprising conversion program code for creating a page description language version of the document using the adjustments.

12. The computer program code of claim 11 further comprising computer code for forwarding the page description language version to a printer.

13. The method of claim 8 wherein the document is a markup language document and wherein the computer program code includes computer program code for determining the width of the line if displayed on a computer display by requesting the width from a browser.

14. A system for preparing a page description language version of an electronic document having one or more lines of characters entered by a document preparer, the system comprising:

one or more processors; and one or more computer readable media having embodied therein computer code which, when executed by the one or more processors, implements the method of claim 1.

15. A system for preparing a page description language version of an electronic document having one or more lines of characters entered by a document preparer, the system comprising;

one or more processors; and one or more computer readable media having embodied therein computer code which, when executed by the one or more processors, implements the method of claim 4.

* * * * *